(12) United States Patent
Reshef

(10) Patent No.: US 6,806,480 B2
(45) Date of Patent: Oct. 19, 2004

(54) MULTI-SPECTRAL PRODUCTS

(76) Inventor: David Reshef, P.O. Box 4298, Rose-Ha'Ayln 48561 (IL)

( * ) Notice: Subject to any disclaimer, the term of this patent is extended or adjusted under 35 U.S.C. 154(b) by 273 days.

(21) Appl. No.: 09/886,977

(22) Filed: Jun. 25, 2001

(65) Prior Publication Data

US 2002/0066864 A1 Jun. 6, 2002

Related U.S. Application Data

(60) Provisional application No. 60/215,764, filed on Jun. 30, 2000.

(51) Int. Cl.$^7$ .................................................. G01J 1/00
(52) U.S. Cl. .................................................... 250/495.1
(58) Field of Search ...................... 250/495.1; 273/348.1

(56) References Cited

U.S. PATENT DOCUMENTS

| | | | |
|---|---|---|---|
| 3,986,384 A | 10/1976 | Giorgi | |
| 4,240,212 A | 12/1980 | Marshall et al. | 434/11 |
| 4,260,160 A | 4/1981 | Ejnell et al. | 273/408 |
| 4,346,901 A | 8/1982 | Booth | 273/408 |
| 4,422,646 A | 12/1983 | Rosa | 273/348.1 |
| 4,505,481 A | 3/1985 | Knight | 273/348.1 |
| 4,605,232 A * | 8/1986 | Hundstad | 273/348.1 |
| 4,659,089 A | 4/1987 | Rosa | 273/348.1 |
| 4,792,142 A | 12/1988 | Davies | 273/348.1 |
| 5,065,032 A | 11/1991 | Prosser | 250/495.1 |
| 5,066,019 A | 11/1991 | Dean et al. | 273/348.1 |
| 5,599,023 A | 2/1997 | Loyd | 273/348.1 |

* cited by examiner

Primary Examiner—Judy Nguyen
(74) Attorney, Agent, or Firm—Blank Rome LLP

(57) ABSTRACT

Multi-spectral products for simulating military and civilian objects or for identification and marking of those objects. The multi-spectral products are provided with sandwiched structure having a first layer and a second layer, overlapping with the first layer. The first layer is patterned by an image of the object in question, which is recognizable in visual specter. The second layer is made of material, which is capable of producing thermal contrast detectable in infrared specter. The second layer produces thermal contrast without using dedicated source of energy and its configuration corresponds to thermal signature cue of the object.

17 Claims, 8 Drawing Sheets

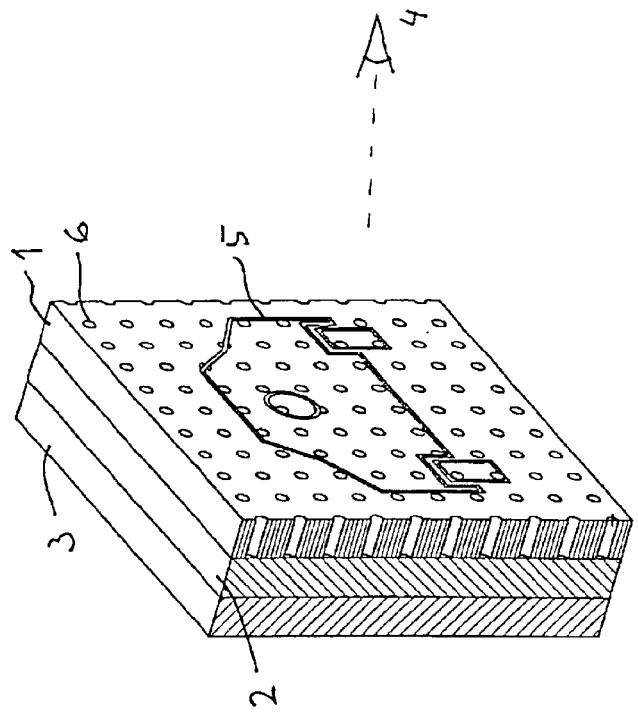
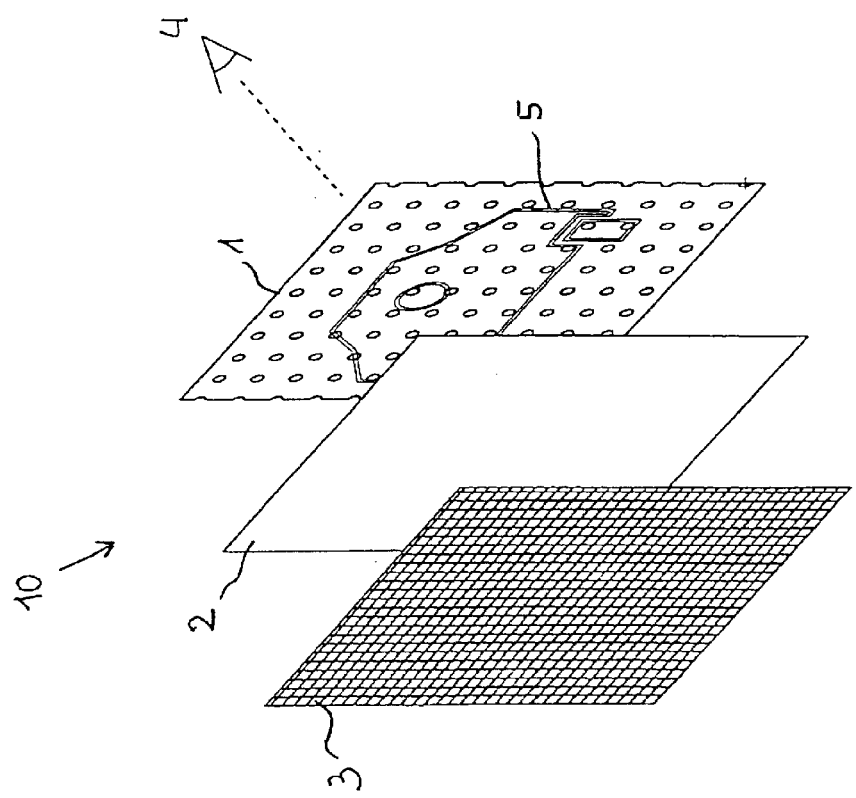

ated thermal target that produces and emits an infrared image for simulating
MULTI-SPECTRAL PRODUCTS

CROSS REFERENCE TO RELATED APPLICATION

The present case is based on Provisional Application Serial No. 60/215,764, filed Jun. 30, 2000, the priority of which is claimed and incorporated herein by reference in its entirety.

FIELD OF THE INVENTION

The present invention refers to targets devices used for simulating of various military and civilian objects, like armored fighting vehicles, battle tanks, armored personnel carriers, military and civilian vehicles. The invention also refers to identification and marking means used for identification of those objects.

The products of the invention are intended mainly but not solely for activities associated with improvement the combat effectiveness of military forces, e.g. gunnery training, friend or foe target recognition and identification training, battlefield simulating and other activities.

The present invention refers to multi-spectral products including targets and identification means capable to simulate both the thermal and visual detectable signatures of various military and civilian equipment and to allow its detection and recognition either in darkness or in the daytime.

BACKGROUND OF THE INVENTION

There are known various military targets, which have been devised for simulating of military assets and intended for use in so-called cover, concealment and deception (CC&D) activities.

The existing military targets used in CC&D activities can be divided into three groups according to the principle of their operation.

The first group includes military targets, which are detectable and recognizable during the day only. An example of such a target is inflatable target apparatus, disclosed in U.S. Pat. No. 4,505,481. This apparatus simulates battlefield and comprises an inflatable target mounted on a trolley. The inflated target is suitable for detection the passage of a projectile. The disadvantage of this group of targets, associated with their limitation strictly to daylight is self-evident.

The second group of targets includes so-called thermal targets, i.e. those, which are detectable and recognizable at night. These targets when heated emanate infrared radiation, known as object's thermal signature. A sighting device or so-called thermal image capable to detect infrared radiation at night or can see the thermal signature in conditions of obscured visibility.

The main disadvantage of these targets is associated with the fact, that they necessitate an external source of energy, capable to heat the target and to induce the infrared radiation. For the sake of brevity, such thermal targets will be referred-to further as active thermal targets.

An example of such active thermal target can be found in U.S. Pat. No. 5,065,032, disclosing thermal integrated target that produces and emits an infrared image for simulating heat emitting equipment or personnel. The image is formed when an electric current passes through a resistive coating applied to the target. This integrated target is intended for use at night only.

Another example of an active thermal target for night vision is described in U.S. Pat. No. 4,260,160. This thermal target is intended for practice shooting in darkness and it comprises a thin supple fabric supported on a rigid frame. The configuration of the fabric simulates the silhouette of an object at which firing would take place, e.g. a tank as seen from its front. The fabric comprises a front protective sheet and a rear radiation-absorbing sheet. The front sheet is held spaced and parallel from the fabric and thus a heat insulating space is defined between them. An infrared radiator heats the heat-absorbing sheet, which radiates as a black body. By virtue of this provision a heat radiation pattern is produced, which closely simulates the object. The disadvantage of this target is similar to that mentioned in connection with U.S. Pat. No. 5,065,032.

The third group includes active thermal targets, which can be used also during the daytime. Those targets are known as multi-spectral targets.

An example of such thermal target is disclosed in U.S. Pat. No. 5,599,023 referring to partially translucent mural decoy. This decoy contains selective translucent panels representing horizontal and other areas of the simulated target. By virtue of this provision, the target represents the object realistically during the day irrespective of the incidence of sunlight to the object. The decoy can be also provided with an auxiliary means for supplying warm air into a bag disposed on one said of the target. By virtue of this provision, the decoy appears warm under infrared observation and therefore is detectable at night.

Even more sophisticated multi-spectral active thermal target is disclosed in U.S. Pat. No. 4,422,646. In this patent, there is described infrared target for military applications. The target comprises a multiplicity of independent modules, each of modules corresponding to a thermal cue of a military object. Each module comprises flexible laminate capable of conducting an electric current, supplied from an external electrical power source. The top layer of the laminate is covered by a flexible, thermal insulating pad containing a multiplicity of discrete air-containing cells through which an infrared signal can pass. The modules are covered by visible graphics to depict the object in visible light and thus the visual signature of the military object is superimposed upon the thermal signature. Nevertheless, by virtue of the cells the thermal signature can be radiated and seen at night through the visual signature.

The active multi-spectral targets are good for recognition of a simulated object. Nevertheless, their sufficient intrinsic disadvantage is the necessity in an auxiliary source of heat energy, which should be sufficient for producing reliably detectable and recognizable thermal signature. Active targets require relatively large amount of electrical power, they are difficult to control, their construction is complicate and they are relatively expensive items.

There are also known so-called low emissivity thermal coatings, which exhibit very low emissivity in the thermal infrared band range. When such a coating covers some areas of an object, the intensity of the infrared radiation, emanated by the coated areas is much lower in comparison with the intensity of the infrared radiation emanated by the uncoated areas. This phenomenon allows using such coatings for thermal insulation applications, in particular for insulation curtains of windows.

Insulation products, based on low emissivity coatings are manufactured for example by Hanita Coatings, Israel. These products comprise sandwiched structure, consisting of several thin aluminum layers interspersing with polyester film layers. A low emissivity lacquer, having emissivity 0.22–0.29, coats the upper aluminum layer. Such sandwiched structure reflects more than 70% of the radiation in the several micron band ranges and provides reliable thermal insulation.

By virtue of low emissivity insulation coating a thermal contrast can be created, enabling detection and recognition within the IR specter of those areas, which were hidden by the coating. The hidden areas of an object will be seen in a thermal imager as "cool" regions, contrasting with the adjacent "hot" regions, corresponding to the uncoated areas. It can be easily appreciated, that this thermal contrast can be induced without heating of an object and thus without the necessity to employ an external source of thermal energy.

The targets based on this approach include so-called passive or no-power targets and they refer to the fourth group. These targets are manufactured for example by Opticoat Associates Inc. U.S.A.

A target employing low-emissivity coating is disclosed in U.S. Pat. No. 3,986,384. This target is used for testing infrared sensors and provides a known spatial pattern such as a bar group. In order to provide a passive target, which is suitable for a range of thermal contrasts the target is formed as a sandwiched structure, consisting of three plane rigid members. The intermediate member is incrementally slidable between the front and rear member. The front member has a cutout, which exposes the intermediate member and the intermediate member has a perforated region in the area exposed by the cutout. The perforations expose the rear member.

The surface of the front and intermediate member is coated by a pattern painted by high emissivity paint (black) and the surface of the rear member is coated by a pattern painted by low emissivity paint. That region of the rear member, which is behind the perforations is coated by a pattern identical with a perforated region of the intermediate member and is painted by high emissivity paint. By incremental sliding the intermediate member between the front and rear member, it is possible to vary the contrasts of the pattern visible on the front member.

Additional applications of military articles, employing low emissivity coatings include so called boresight panels for testing infrared sensors to have an infrared system aligned (boresighted) with a visual system, battleground reference panels.

A boresight panel is configured as a rigid plate having white background (high emissivity object) with applied thereon low emissivity thermal tape (low emissivity object) configured as a known spatial pattern, e.g. cross or a bar group. Since the tape has bright color, it is clearly visible in the daylight. When this plate is viewed through an infrared imager the thermal signature of the tape shows up as a known spatial pattern and can be used to align the thermal IR system with the visual system. The boresight panels are used for testing advanced infrared sensors and they are not suitable for gunnery training.

Battleground panels are used for identification, as resolution test boards, camouflage panels, camouflage battle boards, etc. In these panels, a high emissivity rigid substrate carries stripes of a tape on top of it. When the panel is viewed through an infrared imager, the low emissivity stripes are easily resolved and are distinctive.

The above-mentioned passive targets, provided with low-emissivity coatings are suitable for thermal and visual detection, classification, recognition and identification training associated with testing and alignment of imagers. Unfortunately these targets are not intended for such applications, like live gunnery training, since they are not designed to represent an image of a military asset during the day and its thermal signature at night. The known passive targets represent merely special spatial pattern, which visual and thermal signature should be of identical configuration. In known in the art passive targets, the low emissivity pattern resides on the high emissivity visual pattern and hides thereof. Therefore visual detection and recognition of the image can be difficult and therefore such targets could not be used during the daytime.

Furthermore, the known in the art passive targets are rigid flat structures, their construction is rather sophisticate and it cannot be folded or rolled up into compact configuration, suitable both for convenient storing and rapid set up.

In conclusion it should be emphasized that despite the fact that different visual and thermal targets have been devised there is still exists a need in a new and improved target, which will enable good and reliable representation of various assets, detectable and recognizable round the clock.

OBJECTS OF THE INVENTION

The object of the present invention is to provide a new and improved multispectral products including no-power target and identification means, which sufficiently reduce or overcome the above-mentioned drawbacks of the known in the art targets and identification means.

In particular, the main object of the present invention is to provide a new and improved target and identification means for simulating various military or civilian assets, in which high emissivity pattern depicts visual image of an asset, which is superimposed with a low emissivity pattern, representing thermal signature of the same asset.

The other object of the invention is to provide a new no-power, passive target and identification means, in which the low emissivity pattern is hidden by the visual image of the asset to enable detection and recognition of the thermal signature without deterioration of the visual image.

The further object of the present invention is to provide a new and improved no-power target and identification means, which has very simple construction and is inexpensive.

Still further object of the invention is to provide a no-power passive target means and identification means for simulating or marking of various objects, primarily military assets. These products are suitable for fire gunnery training, simulating battlefield, friend or foe recognition training and identification, air reconnaissance training etc.

Yet, another object of the invention is to provide a versatile no power, passive target and identification means, which reliably represents visual image of either three-dimensional or two-dimensional objects.

Still further object of the invention is to provide a new and convenient target and identification means, which is lightweight and may be easily and rapidly deployed or folded without special tools.

The above and other objects and advantages of the present invention can be achieved in accordance with the following combination of its essential features, referring to different embodiments thereof.

According to one of the preferred embodiments, the target and identification means of the invention is formed as a sandwiched structure comprising:

a rear layer, carrying the structure, a front layer, covered by two-dimensional pattern rendering the simulated object visually detectable and an intermediate layer, overlapping with at least a portion of the front layer, said intermediate layer is capable to simulate thermal signature cue of the object, wherein said front layer is made of a discontinuous material, provided with multiplicity of openings passing the infrared radiation therethrough in order to render said thermal signature cue detectable in darkened conditions by virtue of thermal contrast, while preserving possibility for recognizing the simulated object in visible light.

According to the other embodiments the front layer is made of non-wetting, meshed fabric.

In accordance with the further embodiment, the meshed fabric is made of knitted polyester.

The fabric could be coarse meshed net made of artificial material, e.g. high-density polyethylene.

In accordance with still further embodiment the intermediate layer is made of a polyester sheet coated by a low emissivity thermal coating. The coating has heat reflection of at least 0.7 and renders thermal signature cue detectable by virtue of thermal contrast.

The present invention in its various embodiments has only been summarized briefly.

For better understanding of the present invention as well of its advantages, reference will now be made to the following description of its embodiments with reference to the accompanying drawings.

BRIEF DESCRIPTION OF THE DRAWINGS

FIGS. 1a, b is correspondingly an exploded and cross-sectional view of the target device of the present invention.

FIG. 4b shows three-dimensional structure for deploying the target device, shown in FIG. 4a.

FIGS. 5b, 5c show support structures for deploying the target shown in FIG. 5a.

FIG. 7 shows regions of the intermediate layer, producing thermal image referring to the target device shown in FIG. 5a.

DETAILED DESCRIPTION OF PREFERRED EMBODIMENTS

Figure 7:
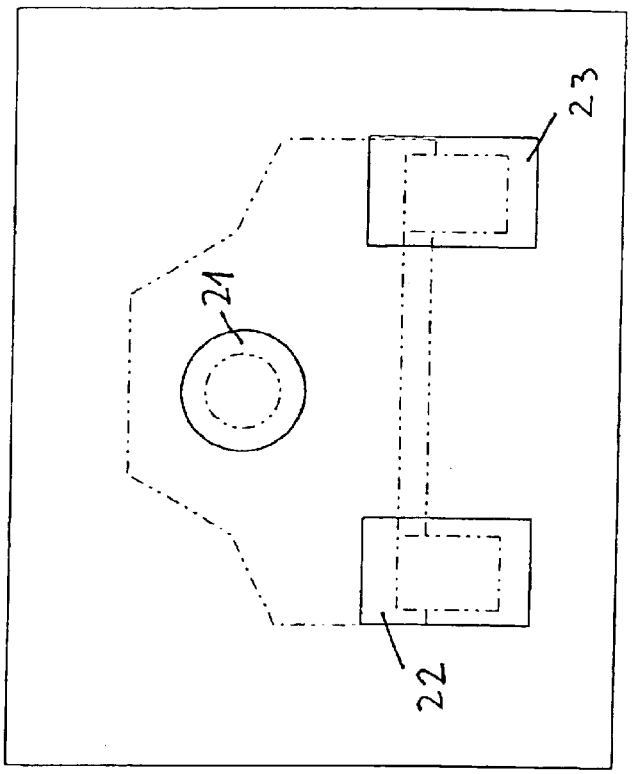

With reference to FIGS. 1a, b in one embodiment of the invention the multi-spectral product refers to a target device 10 formed as a sandwiched, substantially supple structure, consisting of a front layer 1, a rear layer 3 and an intermediate layer 2 situated therebetween. All three layers are superimposed so as to be in overlapping relationship and are joined together to provide an integral structure, which continues in two dimensions. It should be understood that the thickness of layers, shown in FIG. 1b is exaggerated for the sake of clarity. In reality the thickness of the sandwiched structure is not more, than several millimeters.

The target simulates a military or civilian asset, which can be perceived by a viewer as a two- or three-dimensional object. In practice to enhance the reality of perception the perimeter of the structure is configured to emphasize or simulate the silhouette of the object. The front layer of the structure faces towards a viewer 4 so it can detect the simulated object. By virtue of special construction of the target device, which will be explained further the viewer can reliably recognize the simulated object either at night or during the daylight.

Figure 6:
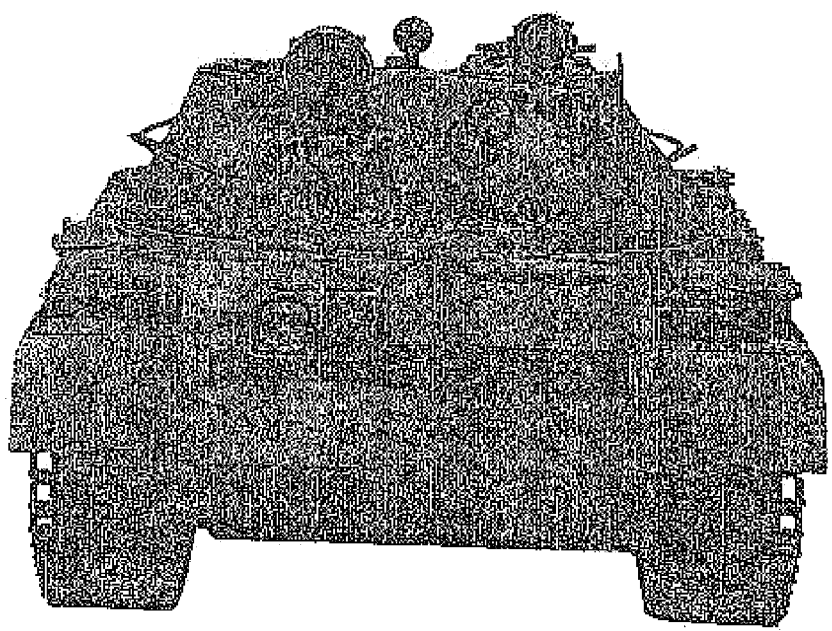
FIG. 6 shows visually detectable three-dimensional image of a tank, depicted by the target device of the invention.

In accordance with the invention the front layer of the target structure is made of a meshed fabric material and to the outwardly facing surface thereof is applied a two-dimensional image 5 of the simulated object. The image can be applied to the front layer by silk screening, hand painting, stenciling, by photographic process, digital printing or any other known in the art suitable technique. The image can be also prepared separately and then secured on the front layer. The image applied to the front layer is two-dimensional and it depicts either two or three-dimensional object, depending on the particular application of the target device. An example of such an image depicting a battle tank is shown in FIG. 6. It should be born in mind that the image applied to the front layer can represent a pattern of an identification means, if the product is to be used for identification or marking.

In practice the material of the front layer is a knitted fabric provided with multiplicity of meshes or holes 6, rendering the front layer discontinuous. The size, configuration and density of the meshes are such, that the discontinuity of the front layer does not deteriorate viewer's visual perception of the applied image and he can recognize the object in visible light and substantially by an unaided eye. It can be easily appreciated, that the image applied to the front layer represents visual signature of the simulated object.

The intermediate layer of the structure is made of thin film, made preferably of polyester. A low emissivity coating, having heat reflectance of at least 0.7 in the thermal infrared region, coats the film. The intermediate layer comprises discrete regions, which overlap with rear and front layer. These regions are configured to depict various thermal signature cues of those areas of the simulated object, which produce heat. Among those areas could be tracks of a tank, wheels of a vehicle, gun barrel of a tank, engine of a vehicle etc. By virtue of low emissivity coating the intensity of the infrared radiation, emanated by the intermediate layer, is low, and the coated regions can be detected by virtue of a thermal contrast, since the neighboring non-coated regions emanate more intense IR radiation, which passes through the meshes of the front layer. The size, configuration and density of meshes are selected to render the infrared radiation passing therethrough reliably detectable by a thermal viewer (not shown) and thus the pattern associated with the coated regions is recognizable as typical thermal signature of the simulated object. Since the products of the invention enable recognition both the visual and thermal signature of an object they are called here multi-spectral products.

The rear layer is made of a coarse mesh net, which is suitable for spreading out the target on a support structure and is sufficiently strong to carry the sandwiched structure of the target device.

It is also advantageous if the net is made of light, synthetic material, which does not absorb water and is not influenced by weather.

Figure 2:
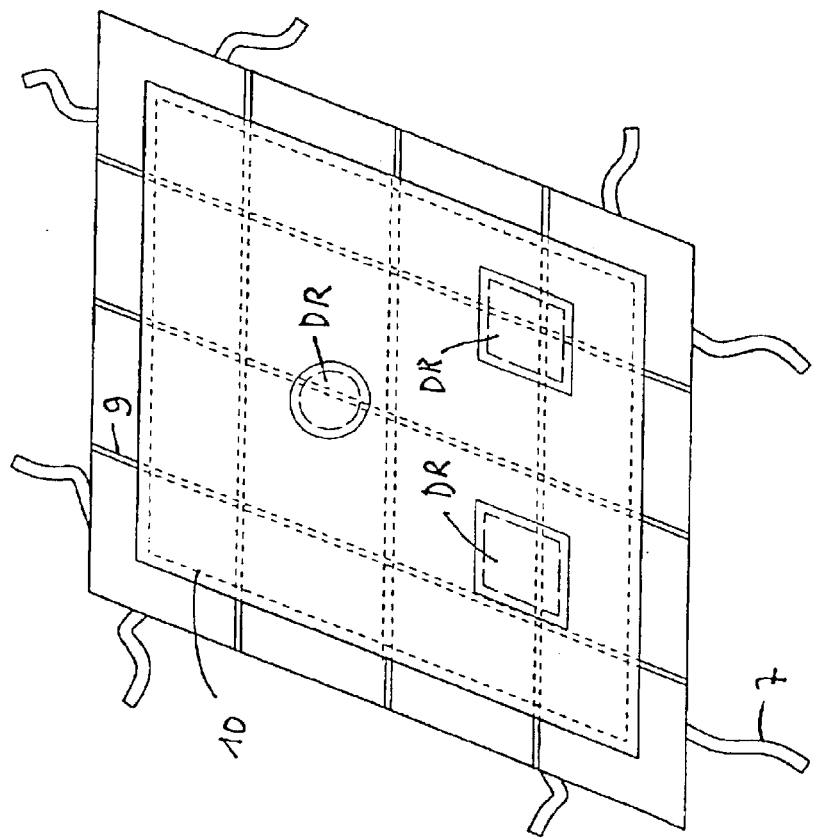
FIG. 2 shows an isometric top view of the target device of the invention.

The spread out target device is schematically shown in FIG. 2. In this condition the target device is ready for deployment on a supporting structure and it can be affixed thereto by plurality of fastening means 7, for example strings, laces, bands, loops etc., made on the lateral sides of the target or affixed to the lateral sides of the target.

Now construction of the layers will be explained in more details.

It has been surprisingly revealed, that it is very convenient to manufacture the sandwiched structure of the multi-spectral product of the invention if the front layer is made from knitted polyester fabric, which has meshes, configured as small preferably elliptical holes with minor diameter 1–3 mm and major diameter 3–5 mm.

An example of suitable polyester fabric is warping knit fabric, manufactured by Pargod Brom Textile Ltd., Israel. This fabric consists of 100% polyester fibers and it is characterized by the following properties:

| | |
|---|---|
| Front warp, yarn counts | 167/1 DTX Flat |
| Back warp, yarn counts | 167/2 DTX - texturised |
| No. of needles - gauge | 12 per inch |
| No. of loops | 32 per cm |
| Mesh size (minor diameter to major diameter) | (1–3) × (3–5) mm |
| Weight per square meter | 100–140 g |

The mesh pattern of this fabric allows representing the visual image applied thereto authentically and at the same time the meshes of the fabric sufficiently pass the infrared radiation and thus the thermal signature emulated by the intermediate layer can be readily recognized.

Furthermore, since this fabric is supple it can be easily folded for storing and unfolded.

The coated areas of the intermediate layer of the target can be manufactured for example from the low emissivity insulation sheet RO9111, produced by Hanita Coatings Ltd., Israel. This product consists of four aluminum layers interspersing with the polyester layers. The top aluminum layer is coated by Beige low emissivity lacquer. The total thickness of the sheet is 24 microns. The emissivity of each aluminum layers is 0.04–0.05 and the emissivity of the lacquer side is 0.22–0.29. The heat reflection of this product is at least 0.7 in the thermal infrared range.

The rear layer can be manufactured from high-density polyester (HDPE) black net, manufactured by Tama Plastic Ltd., Israel. This net is defined by the following properties:

| | |
|---|---|
| Type of netting: | Rachel knitting made of HDPE tapes |
| Shade netting | 75% |
| Longitudinal knitting density (franze): | 400 stitches per meter |
| Lateral knitting density (schuss): | 8 mm |
| Resistance to UV rays: | When used outdoors the material is stable against UV radiation at least four years |
| Melting point: | 132° C. |
| Breaking strength: | at least 78 kg when subject to test similar to Ball burst test |
| Weight per square meter: | 90–100 g |

In the other embodiment the rear layer can be made of the net defined by the following properties:

| | |
|---|---|
| Type of netting | Rachel knitting made of HDPE Tapes |
| Yarn count: | Warp 400 Denier |
| | Weft 500 Denier |
| UV Resistance | 3 Years stability for outdoor UV exposure |
| Heat Resistance | Melting point of raw materials 132 Deg. C. |
| Tensile Strength | Warp 122.8 Lbs |
| | Weft 83.9 Lbs |
| Weight per square meter | 180–200 g |

It has been found, that the above materials render the manufacturing process and the product itself very easy, convenient and inexpensive. The manufacturing process includes the following steps. First the discrete regions of the intermediate layer coated by low emissivity coating and featuring the thermal signature of the simulated object are spread out across the rear layer. These regions are placed in those locations of the target, where its thermal signature is expected to show up. In FIG. 2 these discrete regions are marked as DR. The superimposed regions of the intermediate layer are affixed to the rear layer for example by stitches 8, which are sewn along the perimeter of these regions.

A multiplicity of stripes 9 could be also sewn to the rear side of the target as shown in FIG. 2 to strengthen the structure. Then the two-layer structure is superimposed with the front layer and all three layers are joined together by stitches 10, sewn across the perimeter of the front layer.

Figure 3C:
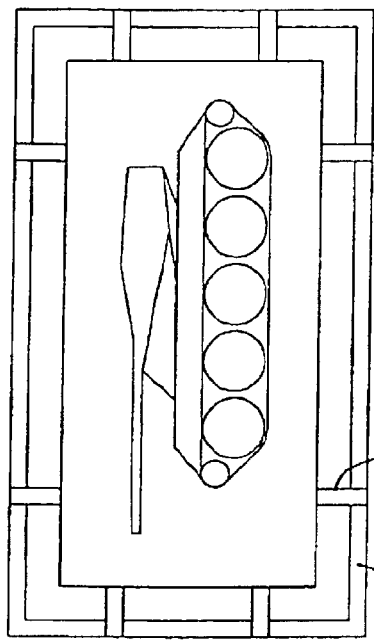
FIG. 3c shows schematically the target device of the invention deployed on a two-dimensional support structure.
Figure 3B:
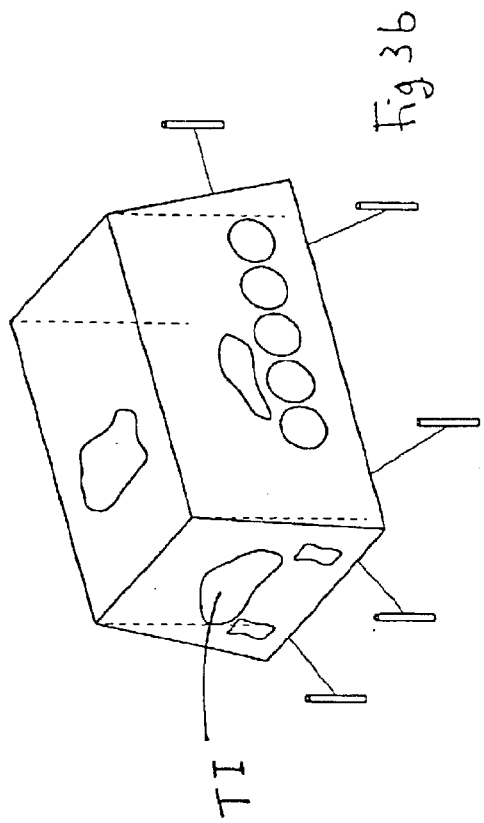
FIGS. 3a, b show schematically the target device of the invention deployed on a three-dimensional support structure.
Figure 3A:
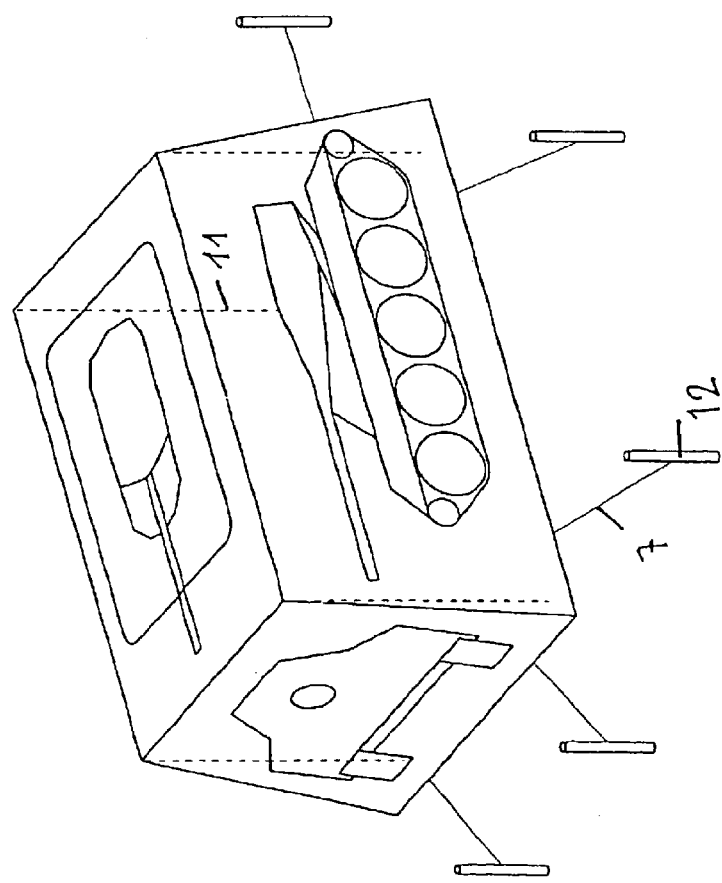

In FIG. 3a is schematically depicted target device of the invention when it is deployed on a three-dimensional support frame 11, which is shown by dotted lines. In this embodiment the target resembles a tent. The central part of the target is spread out horizontally to provide for the visual and thermal signature of the object. In this position the viewer can detect the object from above. The lateral sides of the target can be secured to the ground by fastening means 7 and pegs 12. If it is required to the lateral sides also can be applied a pattern with the visual and thermal image and thus the whole object can be even better perceived. The pattern with thermal image is schematically shown in FIG. 3b and is designated as TI. Such target device could simulate a mobile or static object, e.g. a vehicle, a building, a position, etc. It might be also advantageous if the support frame is collapsible and thus the whole target can be easily dismantled. This renders the target device convenient in transportation and storing.

FIG. 3c depicts another possibility for deployment of the target device. The target is stretched out on a two-dimensional frame 13 and is secured thereon by fastening means 7. In this embodiment the target resembles a flat stand. The stand can be supported from the rear side by a static support structure or be affixed to a mobile support structure, e.g. secured on lateral sides of a vehicle.

Figure 4A:
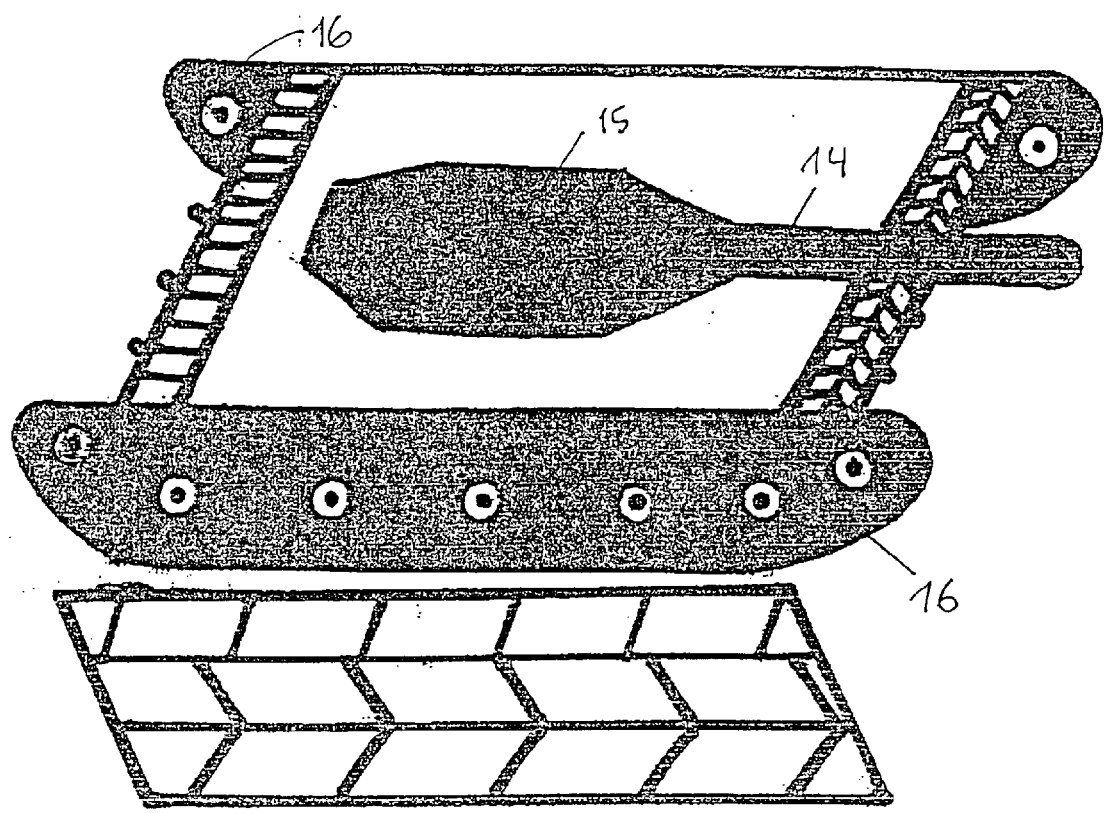
FIG. 4a shows a visual image of the target device of the invention deployed on a three-dimensional structure.
Figure 4B:
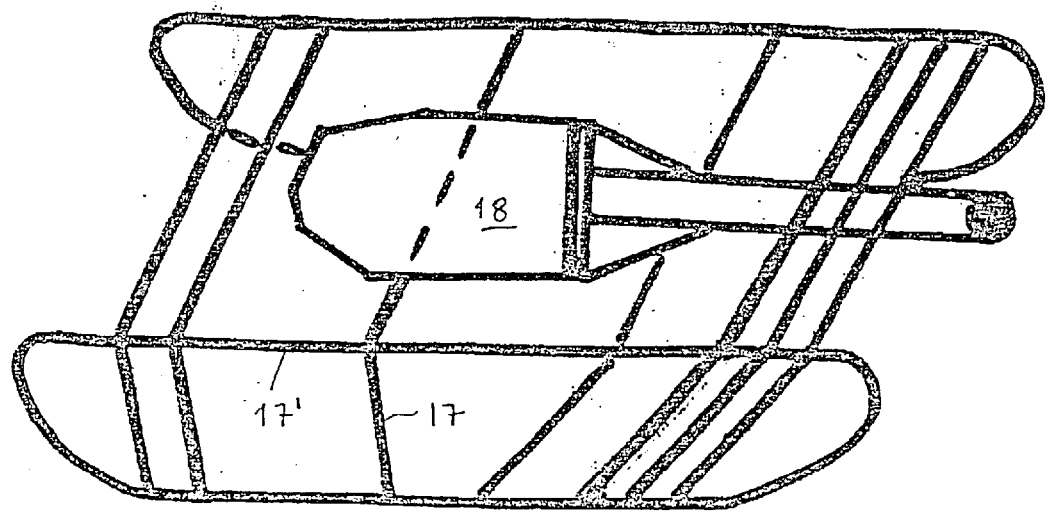

Referring to FIG. 4a a further embodiment of the target device deployed on a three-dimensional support frame is shown. The visual image of the target simulates a battle tank with a gun 14 and a barrel 15. These elements are represented by the horizontal part of the target. The lateral sides of the target depict tracks 16. The support frame of this target is shown in FIG. 4b. It comprises multiplicity of vertical and horizontal supporting bars 17, 17' and a mock-up portion 18, simulating the barrel and the gun. The target deployed on such three-dimensional support frame simulates the object more realistically and it can be better recognized from above. This is especially advantageous for detection, classification, recognition and identification training of crews, which would be taught for air reconnaissance.

Figure 5A:
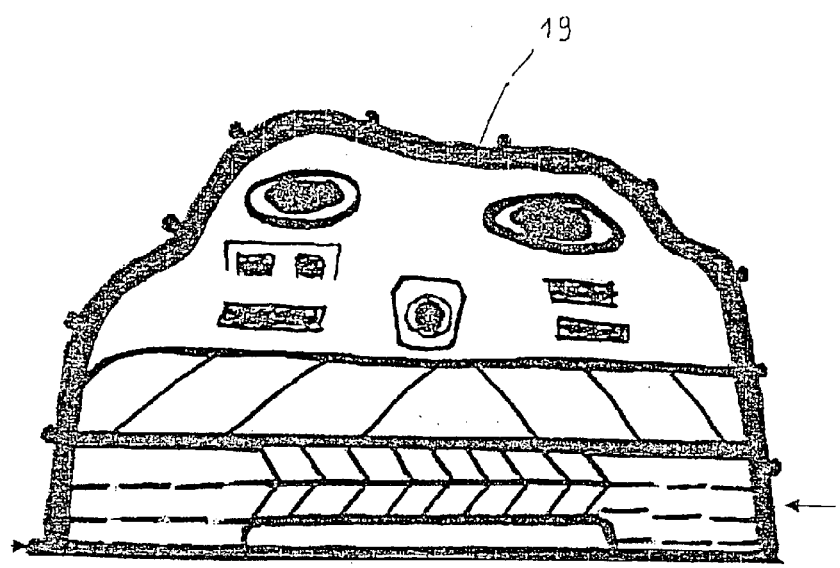
FIG. 5a shows a target device deployed on a support structure and representing a tank.

Referring now to FIG. 5a it is shown an embodiment of the target device in accordance with a stand concept. This target device depicts two-dimensional frontal view of a battle tank, as it is seen during the daylight. For better perception the contour 19 of the upper part of the stand is configured to resemble contour of the real tank.

Figure 5B:
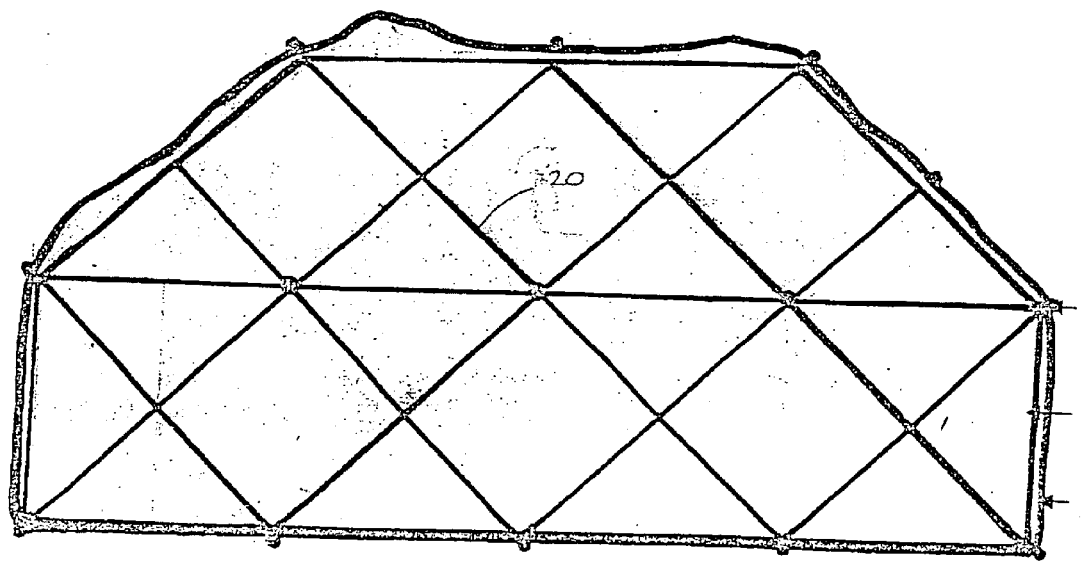
Figure 5C:
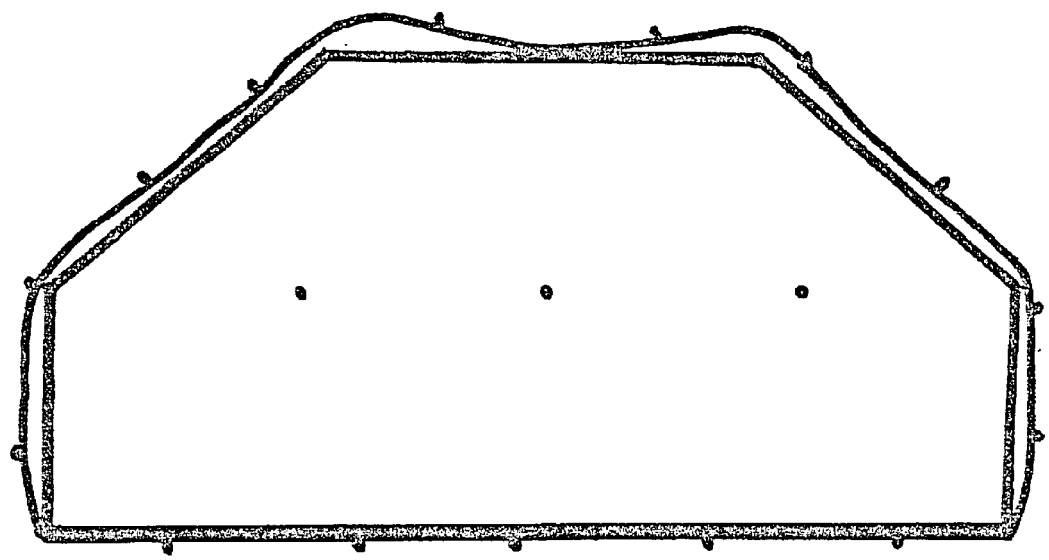

In FIG. 5c is shown two-dimensional structure, carrying the target device, shown in FIG. 5a. It is possible also to support the target device by a collapsible, dismountable lightweight frame structure 20, which is schematically shown in FIG. 5b. The frame structure can be an integral part of the whole target device and thus the device is especially convenient in transporting and storing.

In FIG. 7 are schematically shown those areas of the target device, which constitute thermal signature of the object simulated thereby and therefore are to be seen at night. The areas include for example gun region 21 and left and right tracks 22, 23.

The image of the object simulated by the target device can be prepared by known in the art computer controlled image generation process. By virtue of this process it is possible to achieve realistic visual image of high fidelity, presenting the target with apparent 3-dimesional features. An example of such image, implemented in the target device of the invention is presented in FIG. 6.

Thus the target device of the invention has very simple and inexpensive construction. It can be manufactured from available materials and it is very convenient in setting-up, service and storage. The target device enables good perception of various objects during the daytime and at night and it does not require external source of energy.

It should be appreciated that the present invention is not limited to the above-described embodiments and that one skilled in the art can make changes and modifications without deviation from the scope of the invention, as will be defined in the appended claims.

It is not disclosed in details, but should be appreciated that the invention can be also implemented as marking or identification means, e.g. as marking signal device, camouflage battle board etc.

The rear layer of the sandwiched structure can be made of non-pliable, rigid material, e.g. of cupboard, metal etc. As a rear layer one can even employ existing wall made of metal or other rigid material to which the intermediate layer and the front layer are attached and secured thereon. The rear layer can be made also of net with more dense structure or even made from pliable continuous material, e.g. nylon. The front layer can be made of non-woven, non-continuous material, e.g. plastic sheet, the intermediate layer can comprise any other known in the art low emissivity coating.

The layers can be joined together not by sewn stitches, but by other suitable means, e.g. by gluing, staples, etc. The configuration of meshes can be not elliptical, but of any other suitable shape.

Figure 8A:
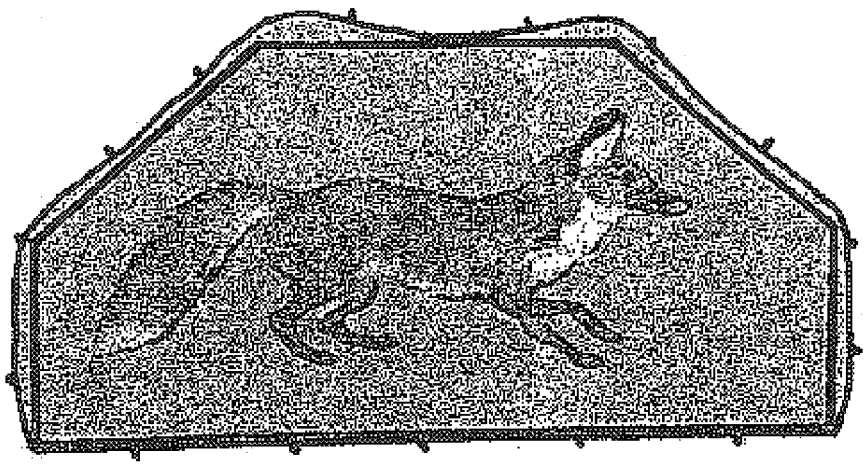
FIGS. 8 a, b depict an embodiment of the target device suitable for training of hunters.
Figure 8B:
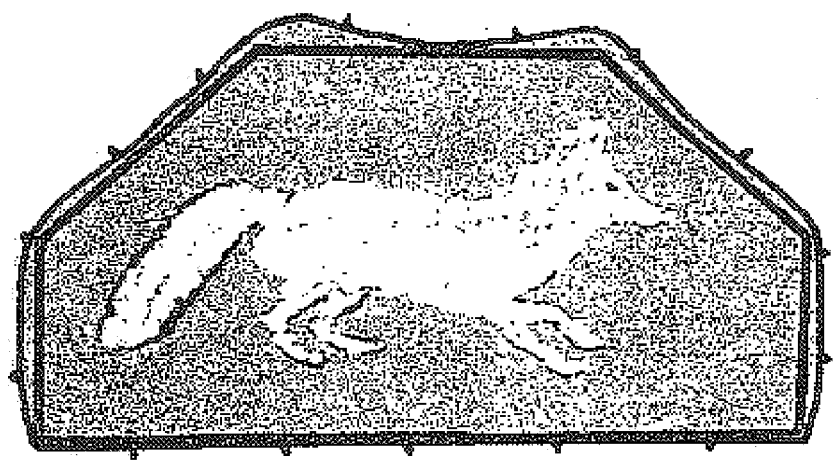

The target device of the present invention can simulate not only military assets but any other object, which should be visually detectable during the day and night. For example one can contemplate target device for training of a hunter. This target device can be deployed on the support similar to that shown in FIG. 5c. In this embodiment the target device depicts an animal or other big game, as shown in FIG. 8a. The thermal image of the animal, as seen at night, is shown in FIG. 8b.

It should also be appreciated that the features disclosed in the foregoing description, and/or in the following claims, and/or in the accompanying drawings may, both separately and in any combination thereof, be material for realizing the present invention in diverse forms thereof.

What is claimed:

1. A multi, spectral product for simulating or marking of an object, said product is configured as a sandwiched structure comprising at least a first layer that is discontinuous, a pattern covering at least a portion of the first layer and rendering the object visually detectable and a second layer superimposed with at least a portion of the first layer, said second layer having a thermal coating that renders the object visually detectable by virtue of a thermal contrast produced without employing en auxiliary source of energy.

2. The multi-spectral product as defined in claim 1, further comprising a third layer, capable of carrying said sandwiched structure.

3. The multi-spectral product as defined in claim 2, in which said third layer comprises a net.

4. The multi-spectral product as defined in claim 3, in which said net is made of a polymeric material.

5. The multi-spectral product as defined in claim 1, in which said first layer is at least partially thermally transparent.

6. The multi-spectral product as defined in claim 5, in which said first layer comprises a fabric.

7. The multi-spectral product as defined in claim 6, in which said fabric is provided with meshes configured as substantially elliptical holes.

8. The multi-spectral product as defined in claim 6, in which said fabric is made of a polymeric material.

9. The multi-spectral product as defined in claim 1, in which said first layer is provided with multiplicity of meshes.

10. The multi-spectral product as defined in claim 1, wherein the thermal coating comprises a low emissivity thermal coating.

11. The multi-spectral product as defined in claim 10, in which said coating is capable of producing infrared radiation which is irradiated through discontinuous portions of the first layer.

12. The multi-spectral product, as defined in claim 10, in which said thermal coating is defined by thermal reflection of about 0.7 in the infrared region and emissivity of about 0.3.

13. The multi-spectral product as defined in claim 1, in which said layers are attached to each other in side-by-side relationship.

14. The multi-spectral product as defined in claim 1, which is provided with fastening means suitable for securing thereof on a support structure.

15. The multi-spectral product as defined in claim 1, in which said second layer comprises discrete regions representing a thermal signature of the corresponding regions of the object.

16. The multi-spectral product as defined in claim 1, in which said object comprises a military asset.

17. The multi-spectral product as defined in claim 1, in which said object comprises a civilian asset.

* * * * *